(12) United States Patent
Yeh

(10) Patent No.: US 6,603,644 B2
(45) Date of Patent: Aug. 5, 2003

(54) MOTOR-DRIVEN CURTAIN ASSEMBLY AND MOTOR CONTROL DEVICE THEREFOR

(76) Inventor: Wei-Cheng Yeh, No. 21, An-Lin 3rd St., Yen-Chao Hsiang, Kaohsiung Hsien (TW)

( * ) Notice: Subject to any disclaimer, the term of this patent is extended or adjusted under 35 U.S.C. 154(b) by 338 days.

(21) Appl. No.: 09/779,131

(22) Filed: Feb. 6, 2001

(65) Prior Publication Data

US 2002/0105763 A1 Aug. 8, 2002

(51) Int. Cl.[7] .............................................. H02H 5/00
(52) U.S. Cl. ........................ 361/31; 361/23; 361/93.1
(58) Field of Search ........................... 361/31, 23, 93.1, 361/100, 115

(56) References Cited

U.S. PATENT DOCUMENTS 4,191,915 A * 3/1980 Johansson ................... 318/464
4,363,513 A * 12/1982 Sahar .......................... 296/140
5,566,644 A * 10/1996 Beery .......................... 119/448

* cited by examiner

Primary Examiner—Stephen W. Jackson
(74) Attorney, Agent, or Firm—Rosenberg, Klein & Lee

(57) ABSTRACT

A motor-driven curtain assembly includes a drive shaft mounted rotatably in a top rail, a motor for driving rotatably the drive shaft, and a curtain unit coupled to the drive shaft for movement between closed and open positions. A motor-control device includes a driving circuit for enabling rotation of the motor in one of positive and negative directions under the control of a control unit, a current limiting circuit for limiting current flow from an external power source to the driving circuit when the motor is subjected to an increase in load resistance, and an over load detector for generating a control signal that is indicative of the amount of current flowing from the current limiting circuit to the driving circuit and that is provided to the control unit, thereby enabling the control unit to deactivate the driving circuit for stopping operation of the motor when overloading of the motor occurs.

20 Claims, 5 Drawing Sheets

MOTOR-DRIVEN CURTAIN ASSEMBLY AND MOTOR CONTROL DEVICE THEREFOR

BACKGROUND OF THE INVENTION

1. Field of the Invention

The invention relates to a motor-driven curtain assembly, more particularly to a motor control device that can provide overload protection to a motor of a motor-driven curtain assembly.

2. Description of the Related Art

Referring to FIG. 1, a conventional motor-driven curtain assembly 1 is shown to comprise a longitudinally extending hollow top rail 10, a longitudinally extending drive shaft 12 mounted rotatably in the top rail 10, a motor 15 for driving rotatably the drive shaft 12, a plurality of first hook members 11 mounted slidably on a bottom side portion of the top rail 10, a pair of second hook members 13 mounted threadedly on the drive shaft 12, a pair of curtain pieces 14, each of which has a top end that engages a respective set of the first hook members 11 and a respective one of the second hook members 13, pairs of first and second optical sensors 161, 162 mounted in the top rail 10 for limiting operation of the motor 15 during closing and opening movement of the curtain pieces 14, and a switch unit 17 for controlling operation of the motor 15.

In use, when a CLOSE key 171 on the switch unit 17 is operated, the motor 15 will be activated to drive the drive shaft 12 to rotate in a positive direction. The second hook members 13 are mounted respectively on externally threaded sections of the drive shaft 12 that are threaded in opposite directions. As such, rotation of the drive shaft 12 in the positive direction will result in axial translation of the second hook members 13 along the drive shaft 12 toward each other. Because each of the second hook members 13 is connected to the leading edge of a respective one of the curtain pieces 14, movement of the second hook members 13 toward each other will result in corresponding movement of the curtain pieces 14 toward each other to a closed position. When the second hook members 13 reach the vicinity of the first optical sensors 161, which are disposed at the intermediate portion of the top rail 10, the first optical sensors 161 will generate an inhibit signal for deactivating the motor 15, thereby completing the closing operation of the curtain assembly 1.

Accordingly, when an OPEN key 172 on the switch unit 17 is operated, the motor 15 will be activated to drive the drive shaft 12 to rotate in a negative direction opposite to the positive direction. Rotation of the drive shaft 12 in the negative direction will result in axial translation of the second hook members 13 along the drive shaft 12 away from each other, thereby moving the curtain pieces 14 away from each other to an open position. When the second hook members 13 reach the vicinity of the second optical sensors 162, which are respectively disposed adjacent to the opposite end portions of the top rail 10, the second optical sensors 162 will generate an inhibit signal for deactivating the motor 15, thereby completing the opening operation of the curtain assembly 1.

Some of the drawbacks of the aforesaid conventional curtain assembly 1 are as follows:

1. The motor 15 is deactivated only upon detection of the second hook members 13 by the first or second optical sensors 161, 162. When the motor 15 is activated to move the curtain pieces 14 to the closed position, and either of the curtain pieces 14 gets caught on an object such that the curtain pieces 14 are prevented from reaching the closed position, the motor 15 will keep operating in the activated state. In order to overcome the increase in load resistance, the amount of electric current flowing through the motor 15 will increase, thereby leading to possible damage to the motor 15 due to overload.

2. Two pairs of optical sensors 161, 162 are used to control deactivation of the motor 15. Installation of the curtain assembly 1 is relatively complicated due to the electrical connection between the optical sensors 161, 162 and the motor 15, which requires the consumer to possess a certain amount of technical skill in order to be able to make such connections.

SUMMARY OF THE INVENTION

Therefore, the object of the present invention is to provide a motor-driven curtain assembly having a motor control device that can provide overload protection to a motor of the curtain assembly and that dispenses with the use of optical sensors to simplify installation of the curtain assembly.

According to one aspect of the invention, a motor-driven curtain assembly comprises a longitudinally extending hollow top rail, a longitudinally extending drive shaft mounted rotatably in the top rail, a motor for driving rotatably the drive shaft, a curtain unit coupled to the drive shaft such that rotation of the drive shaft in a positive direction results in movement of the curtain unit to a closed position, and such that rotation of the drive shaft in a negative direction results in movement of the curtain unit to an open position, and a motor-control device that includes a driving circuit, a control unit, a current limiting circuit and an overload detector. The driving circuit is coupled to the motor for enabling rotation of the motor in the positive and negative directions. The control unit is coupled to the driving circuit and is operable so as to control the driving circuit to enable rotation of the motor in a selected one of the positive and negative directions. The current limiting circuit is adapted to couple the driving circuit to an external power source, and is adapted to limit current flow from the external power source to the driving circuit when the motor is subjected to an increase in load resistance. The overload detector, which is coupled to the control unit and the current limiting circuit, generates a control signal that is indicative of the amount of current flowing from the current limiting circuit to the driving circuit and that is provided to the control unit, thereby enabling the control unit to deactivate the driving circuit for stopping operation of the motor when overloading of the motor occurs.

According to another aspect of the invention, a motor-control device is adapted to be used in a motor-driven curtain assembly that includes a longitudinally extending hollow top rail, a longitudinally extending drive shaft mounted rotatably in the top rail, a motor for driving rotatably the drive shaft, and a curtain unit coupled to the drive shaft such that rotation of the drive shaft in a positive direction results in movement of the curtain unit to a closed position, and such that rotation of the drive shaft in a negative direction results in movement of the curtain unit to an open position. The motor-control device comprises:

- a driving circuit adapted to be coupled to the motor and adapted to enable rotation of the motor in the positive and negative directions;
- a control unit coupled to the driving circuit and operable so as to control the driving circuit to enable rotation of the motor in a selected one of the positive and negative directions;

a current limiting circuit adapted to couple the driving circuit to an external power source, and adapted to limit current flow from the external power source to the driving circuit when the motor is subjected to an increase in load resistance; and an overload detector, coupled to the control unit and the current limiting circuit, for generating a control signal that is indicative of the amount of current flowing from the current limiting circuit to the driving circuit and that is provided to the control unit, thereby enabling the control unit to deactivate the driving circuit for stopping operation of the motor when overloading of the motor occurs.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
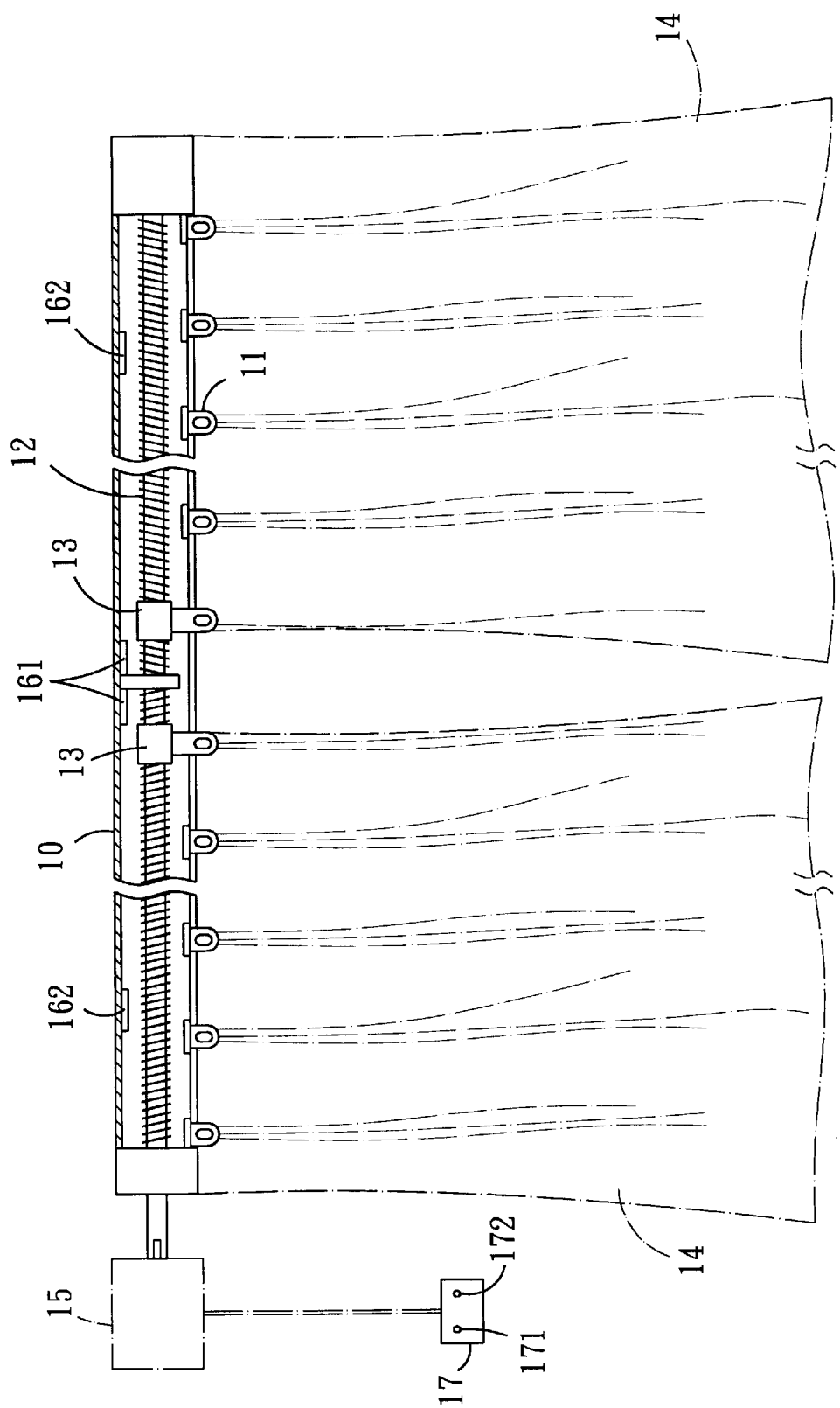
FIG. 1 is a schematic view illustrating a conventional motor-driven curtain assembly.
Figure 2:
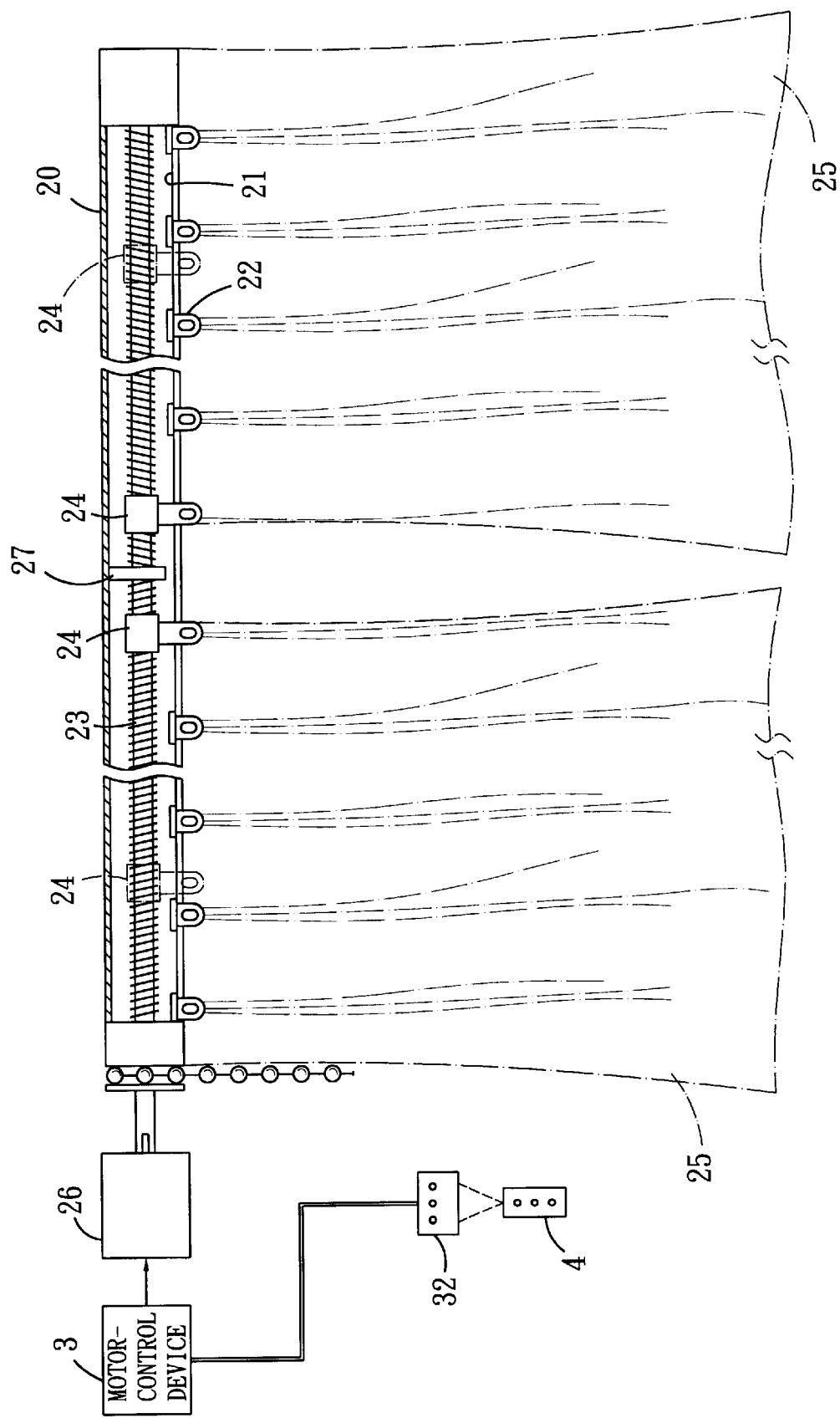
FIG. 2 is a schematic view illustrating the first preferred embodiment of a motor-driven curtain assembly according to the present invention.

Referring to FIG. 2, the first preferred embodiment of a motor-driven curtain assembly 2 according to the present invention is shown to comprise a longitudinally extending hollow top rail 20, a longitudinally extending drive shaft 23 mounted rotatably in the top rail 20, a motor 26 for driving rotatably the drive shaft 23, and a curtain unit including a plurality of first hook members 22, a pair of second hook members 24 and a pair of curtain pieces 25. The top rail 20 has a bottom side portion formed with a longitudinally extending slide groove 21. The first hook members 22 are mounted movably on the bottom side portion of the top rail 20 and are slidable along the slide groove 21. The drive shaft 23 has a pair of externally threaded sections that are threaded in opposite directions. The second hook members 24 are mounted threadedly and respectively on the threaded sections of the drive shaft 23. Each of the curtain pieces 25 has a top end that engages a respective set of the first hook members 22 and a respective one of the second hook members 24. The curtain assembly 2 further includes a motor-control device 3 to control operation of the motor 26.

Figure 3:
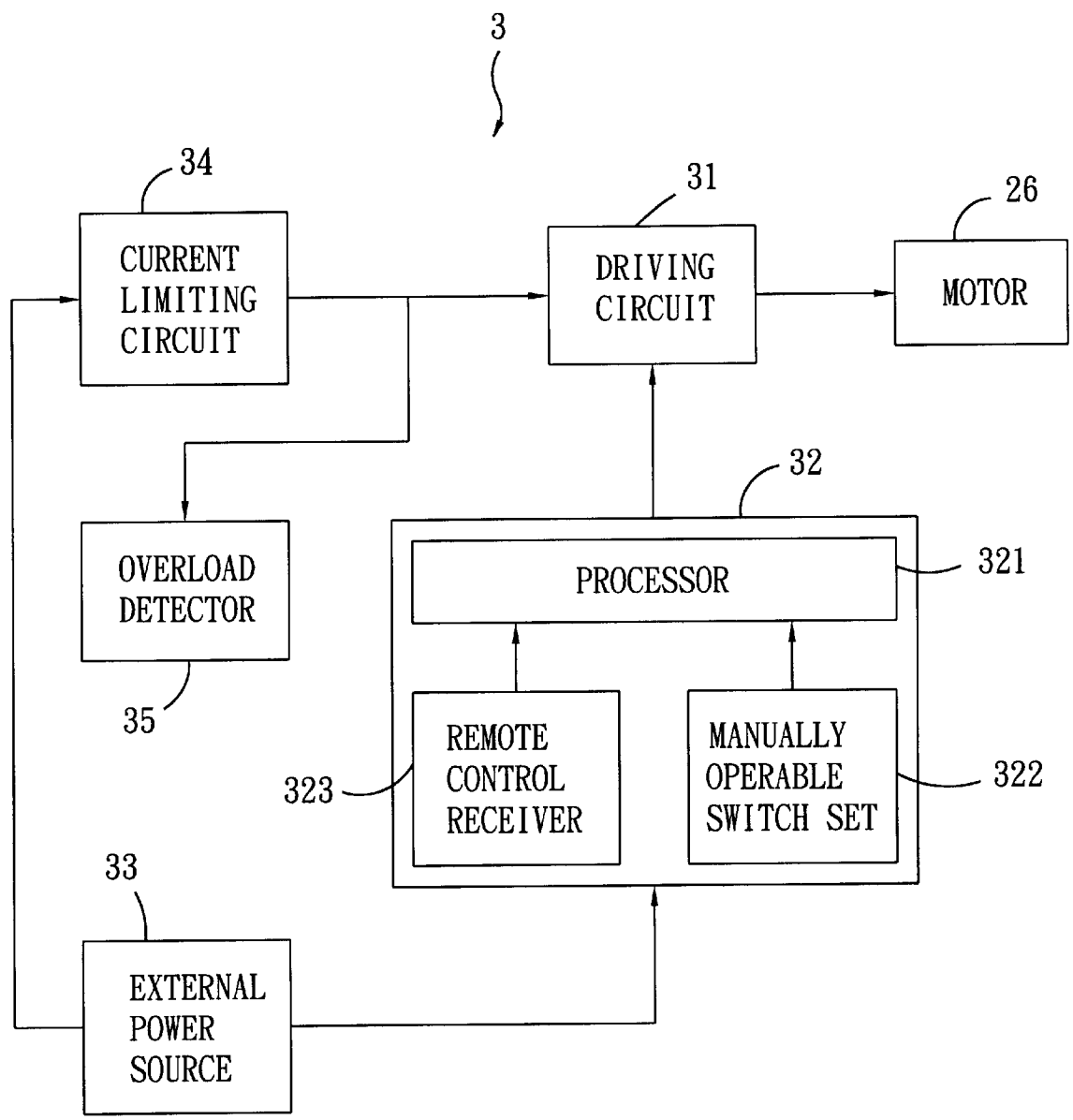
FIG. 3 is a schematic circuit block diagram illustrating a motor-control device of the curtain assembly according to the first preferred embodiment.

Referring to FIG. 3, the motor-control device 3 includes a driving circuit 31, a control unit 32 coupled to the driving circuit 31, a current limiting circuit 34 that couples the driving circuit 31 to an external power source 33, and an overload detector 35 coupled to the current limiting circuit 34 and the control unit 32.

Figure 4:
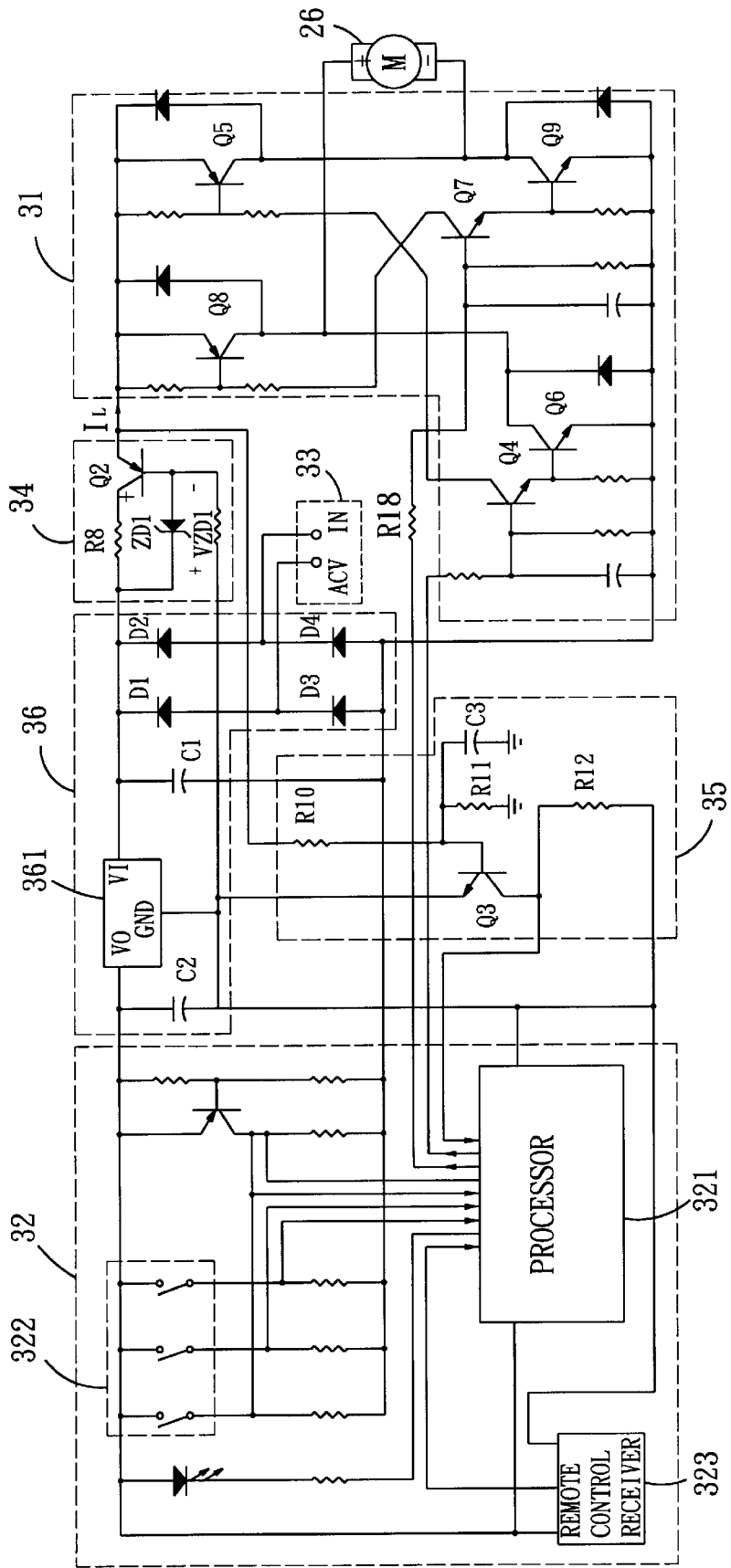
FIG. 4 is a schematic electrical circuit diagram of the motor-control device of the first preferred embodiment.

With further reference to FIG. 4, the driving circuit 31 is coupled to the motor 26, and has a first transistor set, including transistors (Q4, Q5, Q6), for enabling the motor 26 to rotate in a positive direction, and a second transistor set, including transistors (Q7, Q8, Q9), for enabling the motor 26 to rotate in a negative direction.

The control unit 32 includes a processor 321, which is coupled to the driving circuit 31, and a manually operable switch set 322 and a remote control receiver 323, which are coupled to the processor 321. According to control signals from the switch set 322 or the receiver 323, the processor 321 activates the driving circuit 31 for enabling rotation of the motor 26 in a selected one of the positive and negative directions, or deactivates the driving circuit 31 for stopping rotation of the motor 26. The control unit 32 is coupled to the external power source 33 via a regulating circuit 36 that includes a bridge rectifier formed from four diodes (D1, D2, D3, D4), a first capacitor (C1), a voltage regulator 361, and a second capacitor (C2).

The current limiting circuit 34 includes a resistor (R8), a transistor (Q2) and a zener diode (ZD1). The transistor (Q2), such as a PNP transistor, has an emitter terminal coupled to the external power source 33 via the resistor (R8), and a collector terminal coupled to the driving circuit 31. The zener diode (ZD1) has a cathode coupled to the external power source and to the emitter terminal of the transistor (Q2) via the resistor (R8), and an anode coupled to the base of the transistor (Q2). Therefore, when the load current ($I_L$) that flows from the collector terminal of the transistor (Q2) to the driving circuit 31 increases to a predetermined amount sufficient to result in a zener voltage ($V_{ZD1}$) between the resistor (R8) and the base of the transistor (Q2) due to an increase in the load resistance of the motor 26, the zener diode (ZD1) will be reversed-biased to pull-down the collector current and thus prevent a further increase in the load current ($I_L$), thereby preventing damage to the motor 26 due to excessive electrical currents when overloading of the motor 26 occurs.

The overload detector 35 includes a transistor (Q3) resistors (R10, R11, R12), and a capacitor (C3). The resistors (R10, R11) are connected in series to form a voltage divider circuit that is coupled to the collector terminal of the transistor (Q2) of the current limiting circuit 34. The transistor (Q3), such as an NPN transistor, has a collector terminal coupled to the processor 321 and to the voltage regulator 361 via the resistor (R12), which serves as a pull-up resistor. The transistor (Q3) further has a grounded emitter terminal and a base coupled to the junction of the resistors (R10, R11).

During normal operation of the motor 26, where the current limiting circuit 34 supplies the normal load current ($I_L$) to the driving circuit 31, a relatively high voltage is present at the collector terminal of the transistor (Q2). The voltage at the base of the transistor (Q3) at this time is sufficient to trigger the latter into conduction, thereby pulling down the voltage at the collector terminal of the transistor (Q3). The low voltage signal at the collector terminal of the transistor (Q3) is detected by the processor 321 and indicates normal operation of the motor 26.

When the load resistance of the motor 26 is increased such that the load current ($I_L$) is reduced due to the reversed-biased operation of the zener diode (ZD1), a lower voltage will be present at the collector terminal of the transistor (Q2). At this time, the voltage at the base of the transistor (Q3) will be insufficient to trigger the transistor (Q3) into conduction. Because the collector terminal of the transistor (Q3) is connected indirectly to the voltage regulator 361 via the resistor (R12), the processor 321 will detect a high voltage signal at the collector terminal of the transistor (Q3), which indicates an overload condition of the motor 26.

Therefore, with reference to FIGS. 2 to 4, when a remote control transmitter 4 or the switch set 322 is operated for closing the curtain assembly 2, the processor 321 will activate the transistors (Q4, Q5, Q6) of the driving circuit 31 for driving the motor 26 and the drive shaft 23 to rotate in the positive direction. Rotation of the drive shaft 23 in the positive direction will result in axial translation of the second hook members 24 along the drive shaft 12 toward each other due to their threaded engagement with the latter. Because each of the second hook members 24 is connected to the leading edge of a respective one of the curtain pieces 25, movement of the second hook members 24 toward each other will result in corresponding movement of the curtain pieces 25 toward each other to a closed position. At the same time, the overload detector 35 will detect a high voltage from the current limiting circuit 34, and will provide a low voltage signal to the processor 321 to indicate normal operation of the motor 26. Eventually, the second hook members 24 will abut against a stop block 27 at the intermediate portion of the top rail 20, thereby preventing further rotation of the drive shaft 23. The increase in the load resistance of the motor 26 results in a corresponding increase in the load current ($I_L$) until the zener voltage ($V_{ZD1}$) is present between the resistor (R8) and the base of the transistor (Q2). The zener diode (ZD1) is subsequently reversed-biased to pull-down the load current ($I_L$), thus preventing damage to the motor 26. At the same time, the overload detector 35 will detect a lower voltage from the current limiting circuit 34, and will provide a high voltage signal to the processor 321 to indicate the overload condition of the motor 26. In response to the high voltage signal, the processor 321 deactivates the driving circuit 31 to stop operation of the motor 26, thereby completing the closing operation of the curtain assembly 2.

Accordingly, when the remote control transmitter 4 or the switch set 322 is operated for opening the curtain assembly 2, the processor 321 will activate the transistors (Q7, Q8, Q9) of the driving circuit 31 for driving the motor 26 and the drive shaft 23 to rotate in the negative direction. Rotation of the drive shaft 23 in the negative direction will result in axial translation of the second hook members 24 along the drive shaft 12 away from each other, thereby resulting in corresponding movement of the curtain pieces 25 away from each other to an open position. At the same time, the overload detector 35 will detect the high voltage from the current limiting circuit 34, and will provide the low voltage signal to the processor 321 to indicate normal operation of the motor 26. Eventually, the second hook members 24 will be limited at the opposite end portions of the drive shaft 23, which will hinder further rotation of the drive shaft 23. The increase in the load resistance of the motor 26 results in a corresponding increase in the load current ($I_L$) until the zener voltage ($V_{ZD1}$) is present between the resistor (R8) and the base of the transistor (Q2). As such, the zener diode (ZD1) will be reversed-biased to pull-down the load current ($I_L$), and the overload detector 35 will detect the lower voltage from the current limiting circuit 34, and will provide the high voltage signal to the processor 321 to indicate the overload condition of the motor 26. In response to the high voltage signal, the processor 321 deactivates the driving circuit 31 to stop operation of the motor 26, thereby completing the opening operation of the curtain assembly 2.

Therefore, when the motor 26 is activated to move the curtain pieces 25 to the closed position, and either of the curtain pieces 25 gets caught on an object such that the curtain pieces 25 are prevented from reaching the closed position, the resistance to the rotation of the drive shaft 23 will cause a corresponding increase in the load current ($I_L$) until the zener voltage ($V_{ZD1}$) is present between the resistor (R8) and the base of the transistor (Q2). At this time, the zener diode (ZD1) will be reversed-biased to pull-down the load current ($I_L$), thereby preventing damage to the motor 26 due to excessive electrical currents. Furthermore, the overload detector 35 will detect the lower voltage from the current limiting circuit 34, and will provide the high voltage signal to the processor 321 to indicate the overload condition of the motor 26, thereby enabling the processor 321 to deactivate the driving circuit 31 and stop further operation of the motor 26. As such, damage to the motor 26 and tearing of the curtain pieces 25 can be prevented by the motor-control device 3 of this invention.

Figure 5:
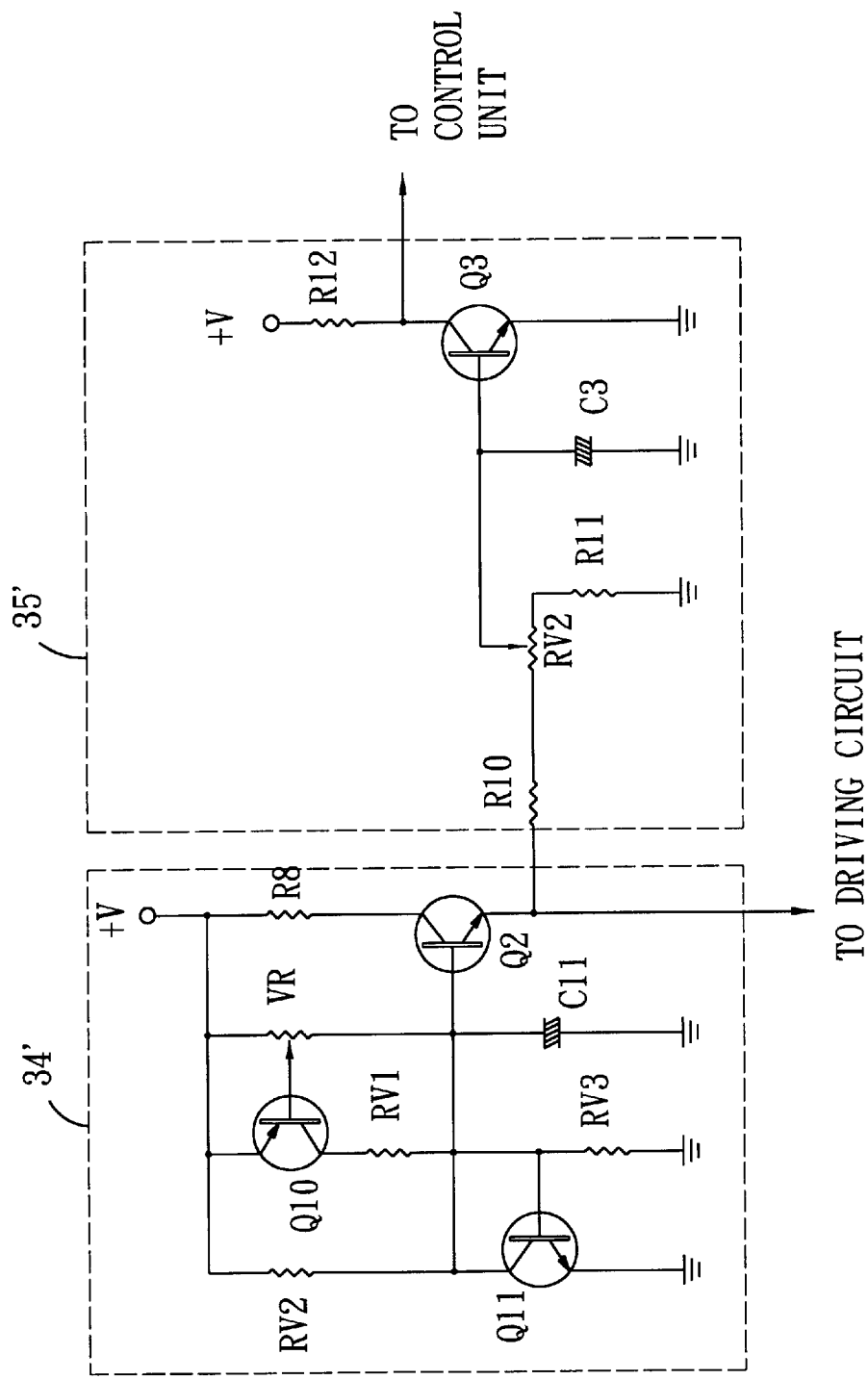
FIG. 5 is a schematic electrical circuit diagram illustrating a current limiting circuit and an overload detector of the motor-control device according to the second preferred embodiment of a motor-driven curtain assembly of this invention.

FIG. 5 illustrates a current limiting circuit 34' and an overload detector 35' of the motor-control device according to the second preferred embodiment of a motor-driven curtain assembly of this invention.

Unlike the current limiting circuit 34 of the previous embodiment, the transistor (Q2) is an NPN transistor, which supplies load current to the driving circuit at the emitter terminal thereof. Instead of a zener diode, a variable resistor (VR) couples the base of the transistor (Q2) to the external power source. The variable resistor (VR) has a tap connected to the base of a PNP transistor (Q10). The transistor (Q10) has an emitter terminal coupled to the external power source, and a collector terminal coupled to the base of the transistor (Q2) via a resistor (RV1). A resistor (RV2) is connected between the emitter terminal of the transistor (Q10) and the base of the transistor (Q2) The base of the transistor (Q2) is further coupled to a capacitor (C11), a resistor (RV3), and to the base and emitter terminal of a transistor (Q11).

During normal operation of the motor (not shown), the current across the resistor (R8) results in a voltage across the emitter terminal and base of the transistor (Q10) which is insufficient to trigger the latter into conduction. When the current through the resistor (R8) increases due to increased load resistance borne by the motor, the voltage across the resistor (R8) increases to result in a sufficient voltage across the emitter terminal and base of the transistor (Q10) for triggering the latter into conduction. Conduction of the transistor (Q10) will result in a reduction in the current through the resistor (R8) and thus the driving circuit to protect the motor from damage. Due to the presence of the variable resistor (VR), the rated load current of the current limiting circuit 34' can be adjusted to suit different motor ratings.

The overload detector 35' differs from the overload detector 35 of the previous embodiment mainly with the inclusion of a variable resistor (RV2) between the resistors (R10, R11). The variable resistor (RV2) has a tap connected to the base of the transistor (Q3). Like the previous embodiment, a higher load current from the current limiting circuit 34' will result in a voltage sufficient to trigger the transistor (Q3) into conduction to result in a low voltage signal to the control unit (not shown) for indicating normal operation of the motor. On the other hand, a lower load current from the current limiting circuit 34' will result in a lower voltage that is insufficient to trigger the transistor (Q3) into conduction, thereby resulting in a high voltage signal to the control unit for indicating an overload condition of the motor. With the addition of the variable resistor (RV2), the overload current settings can be adjusted to suit the specification of the motor that is in use.

Because connection of the motor-control device to the motor is relatively easy to conduct, and because no optical sensors are employed in the motor-driven curtain assembly of this invention, installation of the present invention is accordingly simplified and can be easily performed by the consumer.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A motor-driven curtain assembly, comprising:
   a longitudinally extending hollow top rail;
   a longitudinally extending drive shaft mounted rotatably in said top rail;
   a motor for driving rotatably said drive shaft;
   a curtain unit coupled to said drive shaft such that rotation of said drive shaft in a positive direction results in movement of said curtain unit to a closed position, and such that rotation of said drive shaft in a negative direction results in movement of said curtain unit to an open position; and
   a motor-control device including
      a driving circuit coupled to said motor for enabling rotation of said motor in the positive and negative directions,
      a control unit coupled to said driving circuit and operable so as to control said driving circuit to enable rotation of said motor in a selected one of the positive and negative directions,
      a current limiting circuit adapted to couple said driving circuit to an external power source, and adapted to limit current flow from the external power source to said driving circuit when said motor is subjected to an increase in load resistance, and
      an overload detector, coupled to said control unit and said current limiting circuit, for generating a control signal that is indicative of the amount of current flowing from said current limiting circuit to said driving circuit and that is provided to said control unit, thereby enabling said control unit to deactivate said driving circuit for stopping operation of said motor when overloading of said motor occurs.

2. The motor-driven curtain assembly of claim 1, wherein said driving circuit includes a first transistor set for enabling said motor to rotate in the positive direction, and a second transistor set for enabling said motor to rotate in the negative direction.

3. The motor-driven curtain assembly of claim 1, wherein said control unit includes a processor coupled to said driving circuit and said overload detector, and a manually operable switch set coupled to said processor and operable so as to control said processor to activate said driving circuit for enabling rotation of said motor in the selected one of the positive and negative directions.

4. The motor-driven curtain assembly of claim 1, wherein said control unit includes a processor coupled to said driving circuit and said overload detector, and a remote control receiver adapted to receive remote control signals that are provided to said processor so as to control said processor to activate said driving circuit for enabling rotation of said motor in the selected one of the positive and negative directions.

5. The motor-driven curtain assembly of claim 1, wherein said motor-control device further includes a regulating circuit that is adapted to couple said control unit to the external power source.

6. The motor-driven curtain assembly of claim 1, wherein said current limiting circuit includes:
   a resistor adapted to be coupled to the external power source;
   a transistor having a first terminal coupled to said resistor, a second terminal coupled to said driving circuit, and a base; and
   a zener diode adapted to be coupled between the external power source and said base of said transistor.

7. The motor-driven curtain assembly of claim 6, wherein said transistor is a PNP transistor, said first terminal being an emitter of said transistor, said second terminal being a collector of said transistor, said zener diode having a cathode coupled to said first terminal of said transistor via said resistor, and further having an anode coupled to said base of said transistor.

8. The motor-driven curtain assembly of claim 1, wherein said overload detector includes:
   a voltage-divider circuit coupled to said current limiting circuit; and
   a transistor circuit including a pull-up resistor adapted to be coupled to the external power source, and a transistor having a first terminal coupled to said control unit and adapted to be coupled to the external power source via said pull-up resistor, a grounded second terminal, and a base coupled to said voltage-divider circuit.

9. The motor-driven curtain assembly of claim 1, wherein said current limiting circuit includes:
   a first resistor adapted to be coupled to the external power source;
   a first transistor having a first terminal coupled to said first resistor, a second terminal coupled to said driving circuit, and a base;
   a variable resistor adapted to couple said base of said first transistor to the external power source, said variable resistor having a tap;
   a second transistor having a first terminal adapted to be coupled to the external power source, a second terminal, and a base coupled to said tap of said variable resistor; and
   a second resistor that couples said second terminal of said second transistor to said base of said first transistor.

10. The motor-driven curtain assembly of claim 8, wherein said voltage-divider circuit includes a first resistor, a second resistor and a variable resistor that interconnects said first and second resistors and that has a tap coupled to said base of said transistor.

11. A motor-control device for a motor-driven curtain assembly that includes a longitudinally extending hollow top rail, a longitudinally extending drive shaft mounted rotatably in the top rail, a motor for driving rotatably the drive shaft, and a curtain unit coupled to the drive shaft such that rotation of the drive shaft in a positive direction results in movement of the curtain unit to a closed position, and such that rotation of the drive shaft in a negative direction results in movement of the curtain unit to an open position, said motor-control device comprising:
   a driving circuit adapted to be coupled to the motor and adapted to enable rotation of the motor in the positive and negative directions;
   a control unit coupled to said driving circuit and operable so as to control said driving circuit to enable rotation of the motor in a selected one of the positive and negative directions;
   a current limiting circuit adapted to couple said driving circuit to an external power source, and adapted to limit current flow from the external power source to said driving circuit when the motor is subjected to an increase in load resistance; and an overload detector, coupled to said control unit and said current limiting circuit, for generating a control signal that is indicative of the amount of current flowing from said current limiting circuit to said driving circuit and that is provided to said control unit, thereby enabling said control unit to deactivate said driving circuit for stopping operation of the motor when overloading of the motor occurs.

12. The motor-control device of claim 11, wherein said driving circuit includes a first transistor set adapted for enabling the motor to rotate in the positive direction, and a second transistor set adapted for enabling the motor to rotate in the negative direction.

13. The motor-control device of claim 11, wherein said control unit includes a processor coupled to said driving circuit and said overload detector, and a manually operable switch set coupled to said processor and operable so as to control said processor to activate said driving circuit for enabling rotation of the motor in the selected one of the positive and negative directions.

14. The motor-control device of claim 11, wherein said control unit includes a processor coupled to said driving circuit and said overload detector, and a remote control receiver adapted to receive remote control signals that are provided to said processor so as to control said processor to activate said driving circuit for enabling rotation of the motor in the selected one of the positive and negative directions.

15. The motor-control device of claim 11, further comprising a regulating circuit that is adapted to couple said control unit to the external power source.

16. The motor-control device of claim 11, wherein said current limiting circuit includes:

a resistor adapted to be coupled to the external power source;

a transistor having a first terminal coupled to said resistor, a second terminal coupled to said driving circuit, and a base; and a zener diode adapted to be coupled between the external power source and said base of said transistor.

17. The motor-control device of claim 16, wherein said transistor is a PNP transistor, said first terminal being an emitter of said transistor, said second terminal being a collector of said transistor, said zener diode having a cathode coupled to said first terminal of said transistor via said resistor, and further having an anode coupled to said base of said transistor.

18. The motor-control device of claim 11, wherein said overload detector includes:

a voltage-divider circuit coupled to said current limiting circuit; and a transistor circuit including a pull-up resistor adapted to be coupled to the external power source, and a transistor having a first terminal coupled to said control unit and adapted to be coupled to the external power source via said pull-up resistor, a grounded second terminal, and a base coupled to said voltage-divider circuit.

19. The motor-control device of claim 11, wherein said current limiting circuit includes:

a first resistor adapted to be coupled to the external power source;

a first transistor having a first terminal coupled to said first resistor, a second terminal coupled to said driving circuit, and a base;

a variable resistor adapted to couple said base of said first transistor to the external power source, said variable resistor having a tap;

a second transistor having a first terminal adapted to be coupled to the external power source, a second terminal, and a base coupled to said tap of said variable resistor; and a second resistor that couples said second terminal of said second transistor to said base of said first transistor.

20. The motor-control device of claim 18, wherein said voltage-divider circuit includes a first resistor, a second resistor and a variable resistor that interconnects said first and second resistors and that has a tap coupled to said base of said transistor.

* * * * *